Dec. 21, 1965  S. A. GREGORY  3,224,168
ADSORPTION APPARATUS
Filed Aug. 21, 1961  3 Sheets-Sheet 1

United States Patent Office 3,224,168
Patented Dec. 21, 1965

3,224,168
ADSORPTION APPARATUS
Sydney Absell Gregory, Stafford, England, assignor to Associated Electrical Industries Limited, London, England, a British company
Filed Aug. 21, 1961, Ser. No. 132,899
Claims priority, application Great Britain, Aug. 24, 1960, 29,257/60
4 Claims. (Cl. 55—208)

The invention relates to adsorption apparatus of the kind used for the adsorption of vapours and gases from gaseous mixtures, for example the adsorption of water vapour from air and the adsorption of carbon dioxide from mixtures containing carbon dioxide and nitrogen. Solid adsorbent materials of the type known as "molecular sieve adsorbents" may be used for such purposes.

Adsorption processes using solid materials of the molecular sieve class require the periodic reactivation of the material, for which purpose controlled heating of the bed of adsorbent material is necessary and subsequent cooling.

Consequently the construction and arrangement of heat transfer means in the vessel containing the bed of adsorbent material is of great importance, and the present invention relates particularly to the arrangement and construction of heat transfer means in the vessels of adsorption apparatus using solid adsorbent materials.

In some cases, especially where space is severely limited, it is not possible to cool the adsorption vessel containing the solid adsorbent material by natural convection of air around the external surface of the adsorption vessel and it is an object of the present invention to provide a heat transfer arrangement which is particularly useful in such situations.

According to the present invention a heat transfer unit in or for an adsorption vessel using solid adsorbent material consists of one or more vertical tubes of inverted U-shape, one of the limbs of each U tube having cooling fins secured to the external surface thereof and the second limb of the said tube being plain.

In the simplest case a single U-tube is employed but in either case each U-tube is adapted to be secured in the adsorption vessel containing the solid adsorbent material, such that the open ends of the U tube pass through the bottom of the adsorption vessel and are continuously connected thereto in such a manner as to prevent direct connection from the adsorption bed to the inside of the tube.

The tube may serve to house a stationary source of heat or to convey a stream of a heat transfer medium and in some cases may perform both of these functions.

The means for supplying heat for reactivation of the solid adsorbent material may comprise an electric resistance heating element housed within the finned limb of the U tube. Alternatively heat transfer may be effected by a heating medium such as steam, in which case means for connecting a supply pipe for the said heating medium may be mounted at the end of the finned limb of the U tube. The heating medium may be conducted through a smaller pipe inside the tube or the medium may be lead directly into the said tube instead of through a supply pipe of smaller diameter.

In either case, whether the heat source is a stationary element or a stream of fluid, the cooling of the bed of adsorbent material is effected by forced convection of a current of air which is blown or drawn through the U tube.

According to a further feature of the invention an adsorbent apparatus comprises a plurality of such inverted U tubes these being arranged such that the axis of the plain limb of each U tube is equidistant from the axes of the finned limbs of adjacent tubes.

This arrangement allows the compact assembly of a number of U tubes within a minimum cross-sectional area of an adsorption vessel. For example such a vessel may contain three inverted U tubes with the plain limbs of the U tubes arranged to intervene symmetrically between the gaps left by the finned limbs of the tubes.

The adsorption apparatus, according to the invention, may therefore comprise three inverted U tubes each having a limb provided with heat radiating fins and the other limb plain, such tubes being arranged inside a cylindrical shell, with the axes of the finned limbs of the tubes vertical and equally spaced inside the shell, the plain limbs of the U tubes being also equally spaced and the intervening spaces being packed with solid adsorbent material.

Such an apparatus is especially convenient for forced cooling by a gas circulated through the U tubes and accordingly such tubes are used both for the heating and the cooling parts of the reactivation cycle. In such a case natural convection cooling of the external surface of the vessel is not provided for, and, to avoid heat loss during the heating part of the cycle, the space between the vessel and an enclosing casing may be lagged with a heat insulating material.

The arrangement of looped tubes according to the invention avoids the thermal expansion problems which would be encountered with straight tubes of the same capacity, and the provision of cooling fins on one limb only of the U tube makes possible the concentration of adsorptive capacity with efficient heat transfer within the minimum volume.

An example of an adsorption vessel according to this invention will now be described more precisely with reference to the accompanying diagrammatic drawings, in which.

Figure 2:
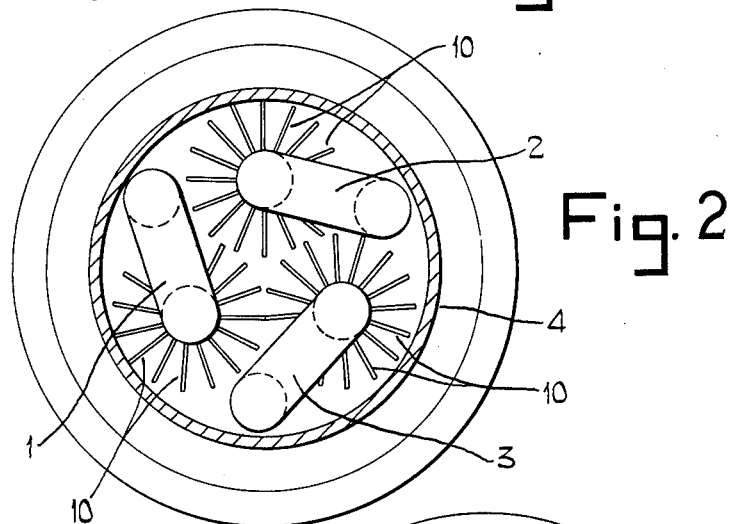
FIG. 2 is a cross-section on FIG. 1 taken in the plane II—II.
Figure 3:
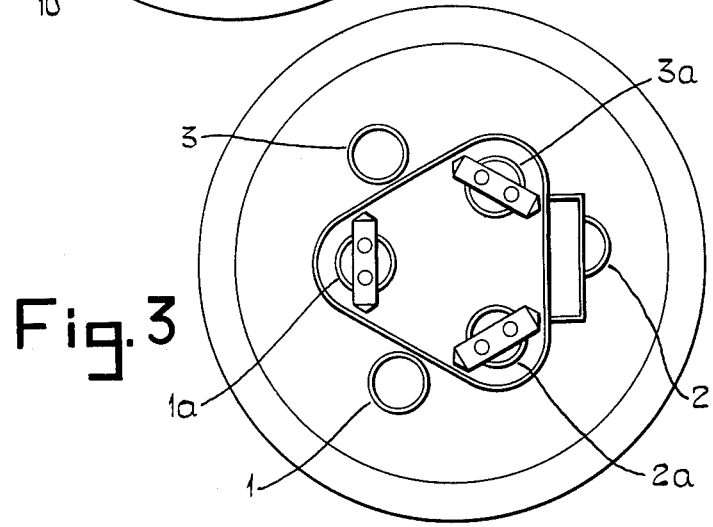
FIG. 3 is a cross-section on FIG. 1 taken in the plane III—III.
Figure 4:
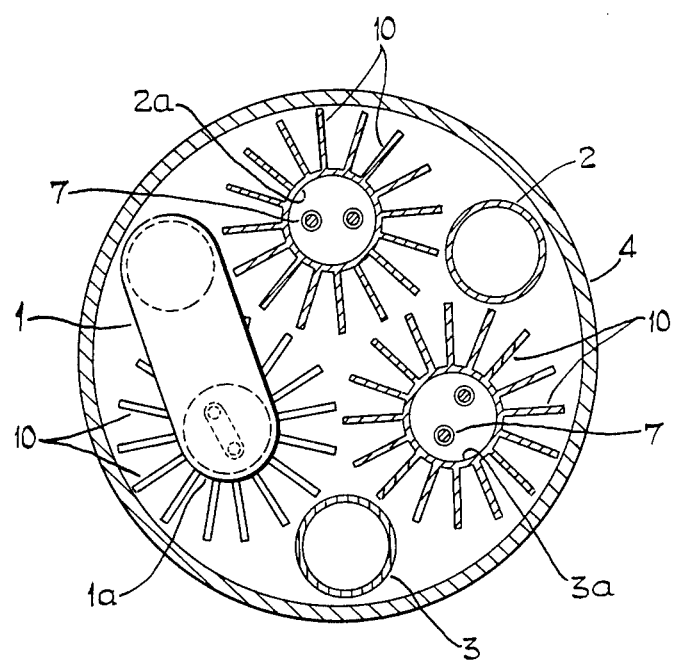
FIG. 4 is a plan view similar to that of FIG. 2 partly in section and enlarged to show the detail of the heating tubes with the electric heating elements contained therein.

Referring now to the drawings, the adsorption vessel comprises three inverted U-tubes 1, 2 and 3, housed within an enclosing shell 4 of continuous section each tube having one of the limbs thereof, 1a, 2a, and 3a, respectively, provided with heat transfer fins 10 extending outwardly therefrom in substantially radial planes into a column of solid granular adsorbent material. As shown in the cross-sectional views of FIGS. 2 and 4 the axes of the finned limbs 1a, 2a and 3a, of the tubes are arranged equidistantly from each other and symmetrically around the main axis of the enclosing shell 4, and the plain limbs of each of the U tubes are arranged to intervene between the two adjacent sets of fins. By this arrangement, the cross-section of the vessel is made as compact as possible and heat transfer between the finned tubes and the solid adsorbent material is accordingly improved.

The enclosing shell 4 terminates downwardly at a radial flange 5 welded thereto, which is bolted to a base plate 6 through which the lower ends of the respective tubes penetrate. Each of the tubes houses an electrical resistance heating element 7, these also being of inverted U-shape, and the lower ends thereof being carried downwardly through the open ends of the U tube limbs 1a, 2a and 3a for connection to electrical terminals contained in a box-like extension 8 secured underneath the base plate, from which leads (not shown), are taken to a suitable electrical supply.

At a suitable distance above the base plate 6 is a perforate partition 13, tack welded to the shell and tubes. The partition 13 may comprise a perforated metal disc with a stainless steel mesh spot welded thereto. The space between the U tubes and the surrounding shell is packed with the granular solid adsorbent material 14 of known type introduced through an opening in the top cover 9, normally closed by a plug 11. In the example shown the finned portions of the limbs 1a, 2a, 3a of the respective tubes terminate below at the partition 13 and likewise the upper level of the shell to which the vessel is packed with the adsorbent material coincides substantially with the upper ends of the fins 10.

After the filling of the vessel, the plug 11 thereof is replaced and the vessel is ready to be placed on stream to process gas, which may be admitted through a valve (not shown) connected to an inlet, such as 15, at the top of the shell and taken off through an outlet 16 at the bottom through a further valve (also not shown).

By means of suitable connections and change-over valves at 15 and 16, process gas may be passed downwardly through the column and subsequently, in the reactivation cycle, purge gas may be passed upwardly through the column.

Figure 1:
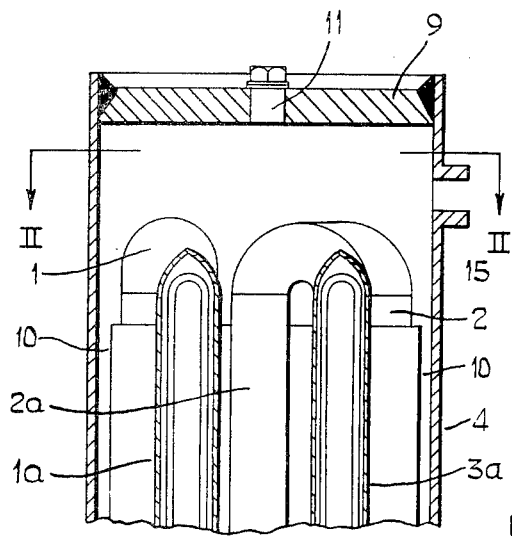
FIG. 1 represents an elevation of an adsorption vessel partly in section in a vertical plane.
Figure 1:
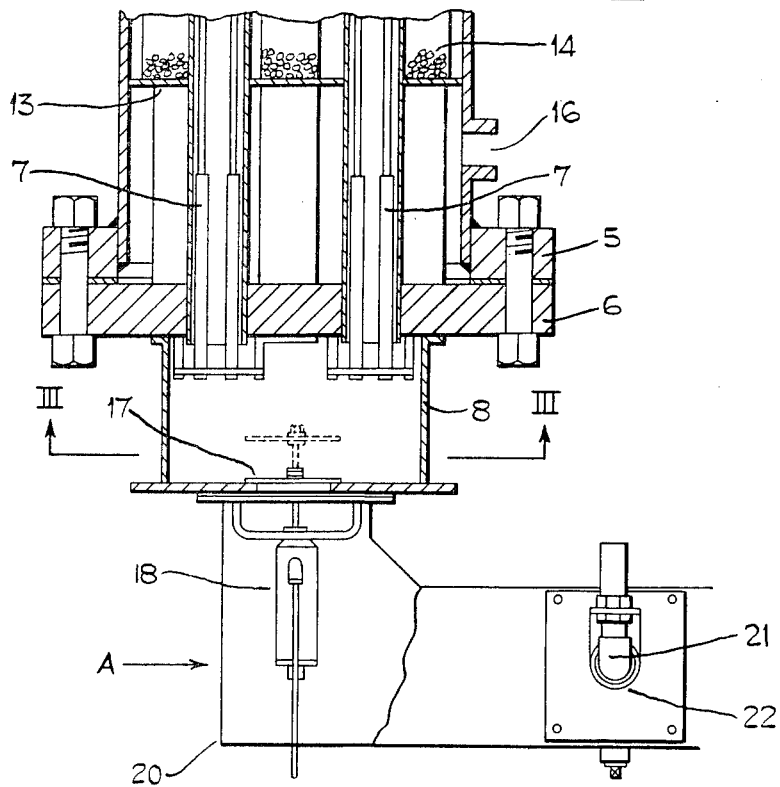
Figure 1A:
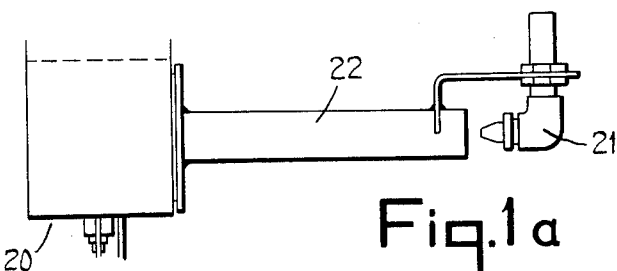
FIG. 1a is a detail of a part of FIG. 1 looking from the direction of the arrow A.

The vessel now being described may be one of a battery of two or more similar vessels which are all selectively connectible to a source of process gas and to a source of cooling air respectively. In a practical arrangement, the vessels will be arranged for alternate operation so that one of the vessels is on stream to process gas whilst the other vessels are undergoing respective parts of their reactivation cycles. For this purpose, automatic electrically controlled timing apparatus may be employed for changing over the connections to the electric heaters and changing over the control valves for the admission of process gas and cooling air at predetermined times. Such automatic timing apparatus is not shown in the drawing, but in FIG. 1 there is shown one of the poppet valves 17 for controlling the admission of cooling air to the vessel, such valve having an open position shown in dotted lines and a closed position shown in full lines, and being controlled by an air cylinder connected to the automatic control apparatus. The air cylinder 18 controlling the poppet valve is contained within a plenum chamber, part of which is shown at 20, to which air is admitted from an injector nozzle 21 and tube 22 as shown in FIGS. 1 and 1a.

In the first portion of the control cycle, the valves (not shown) for admission of process gas are opened, the corresponding valves for the other vessels in the battery being closed. At the end of the "on-stream" period of the adsorption vessel shown in FIG. 1, the supply of the electric resistance heaters is connected and purge gas is forced upwardly through the column for a predetermined time, whereafter the heating elements are again switched off and cooling air is forced internally through the tubes 1, 2 and 3 to complete the reactivation cycle.

Although the adsorption vessel has been described above for heating by means of electrical heating elements, it will be understood that other heating methods can be employed, for example a heating medium, such as steam, may be passed through the U tubes for reactivating the adsorbent material.

What I claim is:

1. An adsorption vessel of the kind suitable for the adsorption of vapours and gases from gaseous mixtures comprising a substantially tubular shell of continuous section arranged with its axis vertical and containing a column of solid discrete adsorbent material, fluid flow connections at the top and bottom of said shell for passing the gas to be treated vertically through the mass of material and at least one heat transfer unit embedded in the column comprising an inverted U tube with downwardly open ends extending through the bottom of the column, one of the limbs of the U-tube having external heat transfer fins extending into thermal exchange contact with the column of solid adsorbent material and the other limb of the U-tube being plain, each of said heat transfer fins extending through said column in a longitudinal direction and being substantially located in a plane which includes the axis of said finned-limb and said fins being symmetrically spaced around the vertical axis of said finned limb.

2. An adsorption vessel according to claim 1, wherein that limb of the U-tube carrying the heat transfer fins contains an elongated electric heater unit for supplying reactivation heat for said adsorbent material said heater being insertable and withdrawable through the downwardly open end of the limb.

3. An adsorption vessel of the kind suitable for the adsorption of vapours and gases from gaseous mixtures comprising a substantially tubular shell of continuous section arranged with its axis vertical and containing a column of solid discrete adsorbent material, fluid flow connections at the top and bottom of said shell for passing the gas to be treated vertically through the mass of material and a number of heat transfer units embedded in the column each comprising an inverted U-tube with downwardly open ends extending through the bottom of the column, one of the limbs of the U-tube having external heat transfer fins extending into thermal exchange contact with the column of solid adsorbent material and the other limb of the U-tube being plain, each of said heat transfer fins extending through said column in a longitudinal direction and being substantially located in a plane which includes the axis of said finned limb and said fins being symmetrically spaced around the vertical axis of said finned limb, the inverted U-tubes being symmetrically internested within the shell in such a manner that in a cross-section normal to the shell axis, the axes of the plain limbs of the U-tubes intersect a circle external to the axes of the finned limbs of the U-tubes and the latter are positioned symmetrically with respect to the axis of the shell.

4. An adsorption vessel of the kind suitable for the adsorption of vapours and gases from gaseous mixtures comprising a substantially tubular shell of continuous section arranged with its axis vertical and containing a column of solid discrete adsorbent material, fluid flow connections at the top and bottom of said shell for passing the gas to be treated vertically through the mass of material and three heat transfer units embedded in the column each comprising an inverted U-tube with downwardly open ends extending through the bottom of the column, one of the limbs of the U-tube having external heat transfer fins extending into thermal exchange contact with the column of solid adsorbent material and the other limb of the U-tube being plain, each of said heat transfer fins extending through said column in a longitudinal direction and being substantially located in a plane which includes the axis of said finned limb and said fins being symmetrically spaced around the vertical axis of said finned limb, the three inverted U-tubes having the axes of the finned limbs of the U-tubes arranged at the apices of an equilateral triangle in cross-section normal to the axis of the shell.

References Cited by the Examiner

UNITED STATES PATENTS

| | | | |
|---|---|---|---|
| 2,083,732 | 6/1937 | Moore et al. | 55—196 |
| 2,450,289 | 9/1948 | Marek | 55—208 |
| 2,499,901 | 3/1950 | Brown. | |
| 2,561,441 | 7/1951 | Lou | 55—33 |
| 2,757,067 | 7/1956 | Cornell et al. | 137—624.18 |
| 2,783,547 | 3/1957 | Bieger et al. | 55—162 |
| 2,975,860 | 3/1961 | Westeren | 55—33 |
| 3,002,729 | 10/1961 | Welsh | 165—183 |

FOREIGN PATENTS

| | | |
|---|---|---|
| 707,093 | 4/1954 | Great Britain. |
| 772,395 | 4/1957 | Great Britain. |

OTHER REFERENCES

Brecket et al.: Crystalline Zeolites, in the Journal of the American Chemical Society, 78 (23), pages 5963–5971, Dec. 8, 1956.

Kern, D.Q.: Process Heat Transfer, Maple Press, 1950, page 523, FIGURE 16.8, and page 753, FIGURE 20.21.

REUBEN FRIEDMAN, *Primary Examiner.*

HERBERT L. MARTIN, *Examiner.*